United States Patent
Benevides et al.

(10) Patent No.: US 11,029,428 B1
(45) Date of Patent: Jun. 8, 2021

(54) RADIOLOGICAL CRITICALITY DOSIMETER USING NANOPARTICLE TECHNOLOGY IN ADDITIVE MANUFACTURING

(71) Applicant: The Government of the United States of America, as represented by the Secretary of the Navy, Arlington, VA (US)

(72) Inventors: Luis A. Benevides, Gaithersburg, MD (US); Alan L. Huston, Aldie, VA (US); Brian L. Justus, Springfield, VA (US); Barbara A. Marcheschi, Fairfax Station, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 13 days.

(21) Appl. No.: 16/404,417

(22) Filed: May 6, 2019

(51) Int. Cl.
*G01T 3/00* (2006.01)

(52) U.S. Cl.
CPC ..................... *G01T 3/00* (2013.01)

(58) Field of Classification Search
None
See application file for complete search history.

(56) References Cited

U.S. PATENT DOCUMENTS

| | | |
|---|---|---|
| 4,835,388 A | 5/1989 | Bruml et al. |
| 4,975,589 A | 12/1990 | Chamberlain et al. |
| 5,004,921 A | 4/1991 | Moscovitch |
| 5,567,948 A * | 10/1996 | Miller ............ G01T 1/10 250/484.5 |
| 2010/0247899 A1* | 9/2010 | Shih ............ C09D 7/67 428/323 |
| 2011/0003279 A1* | 1/2011 | Patel ............ G01D 7/00 435/5 |
| 2011/0081724 A1* | 4/2011 | Swager ............ B82Y 15/00 436/57 |

OTHER PUBLICATIONS

A. Romanyukha, et al., "Effect of Short-Term Sensitivity Loss in LiF:Mg,Cu,P Thermoluminescent Dosemeter and its Implications on Personnel Dosimetry Operations," Radiation Protection Dosimetry 168(2):204-211 (2016) (advance publication Mar. 11, 2015).
Bureau of Medicine and Surgery, "Radiation Health Protection Manual," NAVMED P-5055 (Feb. 2011).
Naval Electronic Systems Command, "Technical Manual for RADIAC Detector DT-518/PD and Accident Dosimeter for DT-526/PD," NAVELEX 0969-133-1010 (May 1974).
D.C. Ward, et al., "Personal Nuclear Accident Dosimetry at Sandia National Laboratories," SAND96-2204 (Sep. 1996).

\* cited by examiner

Primary Examiner — Hugh Maupin
(74) Attorney, Agent, or Firm — Dawn C. Russell

(57) ABSTRACT

Compositions including additive manufacturing materials incorporating radiological detection materials therein are provided. Also provided are apparatus and methods, which may be utilized to monitor and measure nuclear criticality events, and determine if personnel have been exposed to ionizing radiation. The compositions, apparatus, and methods beneficially improve accuracy in assessing radiation exposure, particularly neutron exposure, and reduce degradation of the radiological detection materials.

20 Claims, 7 Drawing Sheets

PRIOR ART
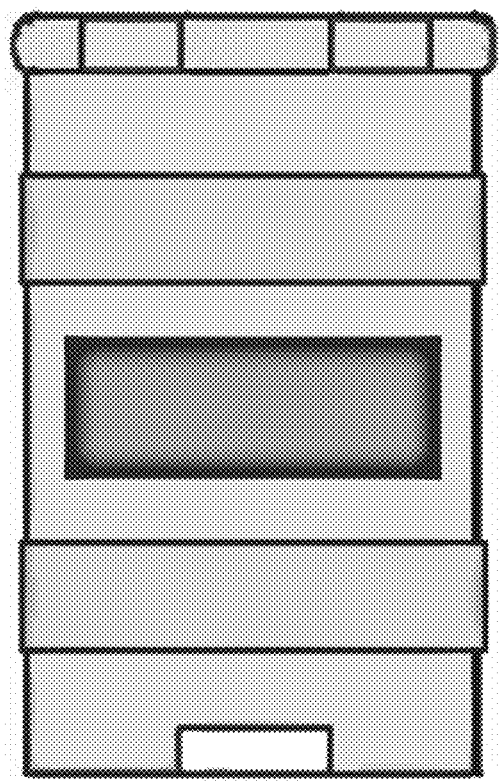
FIG. 1A
FIG. 1B
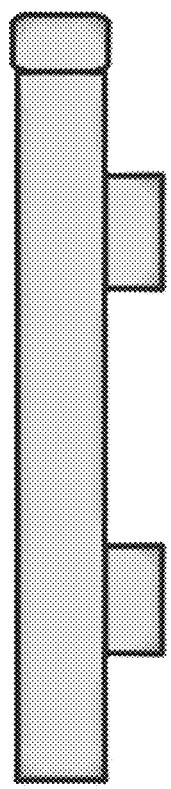
FIG. 1C
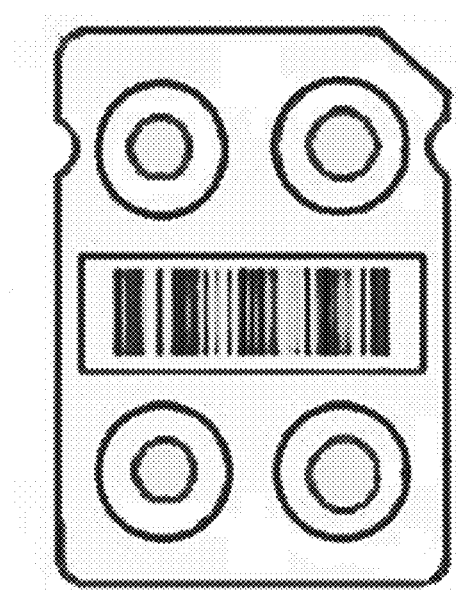
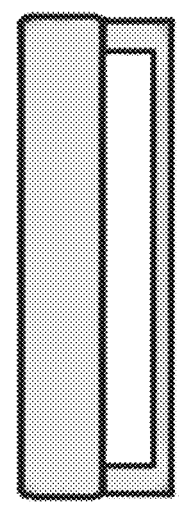
FIG. 1D

400

500

RADIOLOGICAL CRITICALITY DOSIMETER USING NANOPARTICLE TECHNOLOGY IN ADDITIVE MANUFACTURING

FIELD OF THE INVENTION

The invention provides compositions including additive manufacturing materials incorporating radiological detection materials therein. Also provided are apparatus and methods, which may be utilized to monitor and measure nuclear criticality events, and determine if personnel have been exposed to ionizing radiation. The compositions, apparatus, and methods beneficially improve accuracy in assessing radiation exposure, and reduce degradation of radiological detection materials.

BACKGROUND

A criticality event is an uncontrolled nuclear chain reaction, typically representing the unintentional assembly of a critical mass of a given fissile material in an unprotected environment. An unprotected environment can occur in the operation of fuel processing, nuclear power plant operation, and/or nuclear weapon assemblies. Personnel exposed to these environments are continuously monitored to ensure that they do not receive excessive doses of radiation.

One monitoring device is the DT-702/PD thermoluminescent dosimeter (TLD), which is based on the Thermo Scientific Harshaw™ Model 8840 holder (shown in FIGS. 1A, 1C, and 1D) and 8841 card (shown in FIG. 1B) (Thermo Fischer Scientific Inc., Waltham, Mass., USA). The DT-702/PD dosimeter is used to monitor personnel exposure to beta, gamma, x-ray, and neutron radiation.

The Model 8841 dosimeter card uses LiF:Mg,Cu,P elements that are encased in polytetrafluoroethylene and mounted on an aluminum card. Three of the four elements provided on the card are formed using $^7$LiF:Mg,Cu,P (for photon and beta particle detection) and one of the four elements is formed using $^6$LiF:Mg,Cu,P (for photon, beta particle, and low-energy albedo neutron detection). The Model 8840 holder includes four discriminating filters that permit discrimination between gamma rays, X-rays, neutrons, and beta particles. The filters in the holder include an open window to permit detection of beta particles, a plastic filter, and lead filters.

The DT-702/PD is evaluated at regular intervals to determine radiation exposure levels using the Harshaw Model 8800PC TLD reader, which uses nitrogen gas to heat the TLD elements encapsulated in Teflon. Personnel are monitored for deep dose equivalent (DDE) and shallow dose equivalent (SDE) exposure. The maximum annual exposure limits for radiation workers is 5,000 mrem DDE and 50,000 mrem SDE. The reader has four thermocouples located at the exit of four heater nozzles, which control the temperature of the nitrogen used to heat the four TLD elements (one for each element).

The DT-702/PD TLD and reader are described, for example, in U.S. Pat. Nos. 4,835,388, 4,975,589, and 5,004,921. The contents of these patents are incorporated herein by reference in their entirety.

It has been found that the DT-702/PD may experience loss of sensitivity under certain conditions, such as overheating of the Model 8841 card during annealing. This may result in underreporting of the actual level of radiation exposure received. This phenomenon has been described in several publications. See, for example, A. Romanyukha et al., "Effect of Short-Term Sensitivity Loss in LiF:Mg,Cu,P Thermoluminescent Dosemeter and Its Implications on Personnel Dosimetry Operations," Rad. Prot. Dosimetry 168 (2):204-211 (2016).

Another monitoring device is the DT-518/PD Casualty Dosimeter system, which was first developed by the U.S. Naval Radiological Defense Laboratory. The DT-518/PD was designed to be used both as an area monitor and to be placed on personnel dosimeters. The device was removed from personnel dosimeters in the early 1970s. See Radiation Health Protection Manual, NAVMED P-5055 (February 2011).

The DT-518/PD contains a $^7$LiF thermoluminescent dosimeter powder for gamma and x-ray dose measurements, sulfur pellets for fast neutron fluence and dose measurements, and indium foils used for screening purposes to determine the presence or absence of a significant neutron exposure. These detector materials are contained in a stainless steel tube. The dosimeters are sealed in extruded cellulose butyrate tubing sealed with molded end plugs.

The initial method of evaluating an DT-518/PD activation is to use a multifunction Radiation Detection, Indication, and Computation (RADIAC) instrument, such as the DT-265/PDQ, with a DT-680/PDQ beta/gamma probe to provide an initial evaluation of the neutron activation of the indium foils, as well as a rudimentary evaluation of personnel exposure at the site of the criticality, as discussed in the RADIAC Technical Manual for DETECTOR DT-518/PD, (NAVELEX 0969-133-1010). After being returned to the Naval Dosimetry Center (NDC), the dosimeter contents are removed from the cellulose butyrate tubing. Each component is weighed and then evaluated using appropriate laboratory equipment. The sulfur tablets are evaluated using a Liquid Scintillation counter, and the indium foil is evaluated using a gamma spectroscopy system. The weight of each component establishes the number of target atoms available for activation and is used in the calculation for dose determination.

The DT-518/PD was evaluated by the NDC to reestablish the protocols to read and extract exposure information. As part of this effort, it was discovered that the indium foil was oxidized in a majority of the dosimeters, and the sulfur tablets also showed degradation. The degradation was found to be a result of moisture intrusion into the extruded cellulose butyrate tubing used to hold the components of the dosimeter. The moisture converted the sulfur tablet into sulfuric acid, which subsequently oxidized the indium foil. Unfortunately, as a result of the degradation, the internal components were cross-contaminated, rendering it difficult to obtain clean samples for further evaluation.

Accordingly, there is a need in the art to retain the diagnostic capabilities of existing dosimeters, while resolving the complicating issues of moisture intrusion, degradation of internal detection components, and lack of sensitivity or accuracy in measuring radiation exposure.

SUMMARY OF THE INVENTION

The invention described herein, including the various aspects and/or embodiments thereof, meets the unmet needs of the art, as well as others, by providing compositions including additive manufacturing materials incorporating radiological detection materials therein. Also provided are apparatus and methods, which may be utilized to monitor and measure nuclear criticality events, and determine if personnel have been exposed to ionizing radiation. The compositions, apparatus, and methods beneficially improve accuracy in assessing radiation exposure, and reduce degradation of radiological detection materials.

In a first aspect of the invention, a nuclear accident dosimeter is provided that includes a polymer, and nanoparticles of a detector material selected from the group consisting of indium, gold, copper, titanium, rhodium, nickel, iron, aluminum, niobium, silicon, sulfur, and combinations thereof, where the nanoparticles are dispersed through the polymer, forming a detector composition.

In another aspect of the invention, a radiation detection apparatus is provided that includes a radiation dosimeter having a container and one or more radiation detection materials therein; and a polymeric detection material provided as at least a portion of the container, the polymeric detection material comprising nanoparticles of a detection material selected from the group consisting of indium, gold, copper, titanium, rhodium, nickel, iron, aluminum, niobium, silicon, sulfur, and combinations thereof dispersed through a polymer. The radiation detection apparatus permits rapid reading of radiation exposure levels, and exhibits greater accuracy in detecting radiation exposure, particularly neutron exposure, as compared to radiation dosimeters not incorporating the compositions of the invention.

In a further aspect of the invention, a method for assessing radiation exposure includes providing a radiation dosimeter apparatus including a first detector material; providing a radiation detector composition on the radiation dosimeter apparatus, the radiation detector composition comprising a polymer having nanoparticles of a second detector material selected from the group consisting of gold, copper, sulfur, and indium dispersed therethrough; and measuring activation of the first and second detector materials. In some aspects of the invention, the activation of the first detector material is compared with the activation of the second detection material.

Other features and advantages of the present invention will become apparent to those skilled in the art upon examination of the following or upon learning by practice of the invention.

BRIEF DESCRIPTION OF THE DRAWINGS

FIG. 1A is a front view of the Harshaw Model 8840 TLD card holder with strap clips/belt loops that is used in DT-702/PD. FIG. 1B is a front view of the Harshaw Model 8841 card. FIG. 1C is a side view of the Harshaw Model 8840 card holder, and FIG. 1D is a top view, and both show the orientation of the strap clips/belt loops.

DETAILED DESCRIPTION OF THE INVENTION

Figure 2:
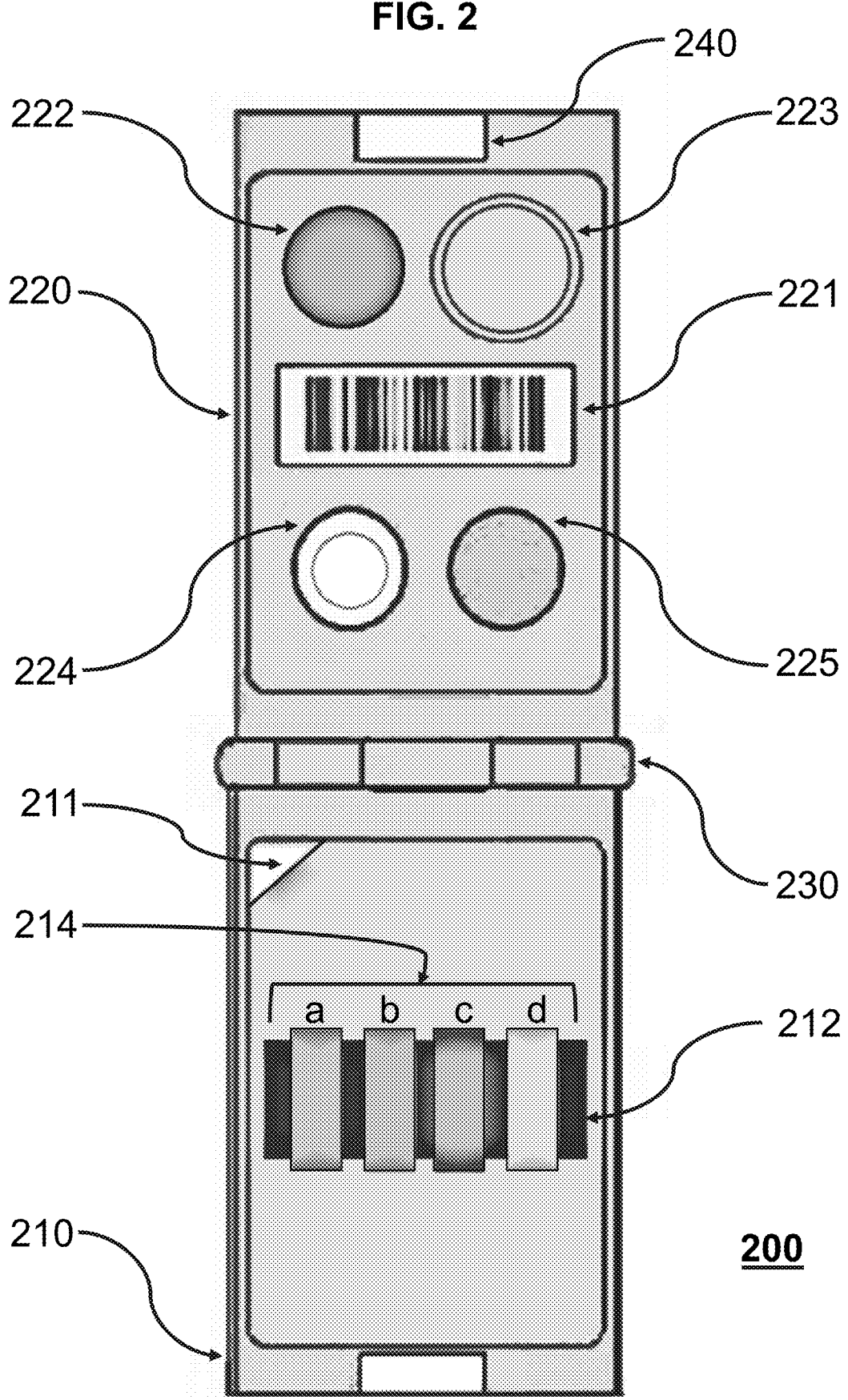
FIG. 2 is a front view of the opened Harshaw Model 8840 card holder, showing the internal components of the card holder without the Harshaw Model 8841 card therein. A first option for providing the compositions of the invention within the DT-702/PD is shown.

The invention provides compositions including additive manufacturing materials incorporating radiological detection materials therein. Also provided are apparatus and methods, which may be utilized to monitor and measure nuclear criticality events, and determine if personnel have been exposed to various types of radiation, particularly neutron exposure. The compositions, apparatus, and methods beneficially improve accuracy in assessing radiation exposure, and reduce degradation of radiological detection materials.

The compositions, apparatus, and methods of the invention avoid problems such as reduced sensitivity and component degradation by incorporating nanoparticles of detection materials, such as gold, copper, indium, and sulfur, into additive manufacturing materials. These compositions may then be used as components of radiation dosimeters.

The materials, apparatus, and methods of the invention may be used to determine the extent of radioactive exposure of a specific individual and/or in a given environment. For purposes of this invention, the contents of NAVMED P-5055 "Radiation Health Protection Manual" (February 2011), including Change Transmittal One (April 2018), are incorporated herein by reference. NAVMED P-5055 provides definitions in Chapter 1, as well as methods for estimating personnel doses in Chapter 5. Dosimetric devices are described in Chapter 6, including personal dosimeters and accident dosimeters. Dosimeters and measurement of radiation to which dosimetric devices are exposed are described, for example, in the report by D.C. Ward et al, "Personal Nuclear Accident Dosimetry at Sandia National Laboratories," SAND96-2204 (September 1996), the contents of which are also incorporated herein by reference.

Compositions

Compositions of the invention provide one or more materials useful for detecting ionizing radiation, particularly neutrons. The compositions are less susceptible to degradation due to exposure to moisture than existing radiation detection compositions.

The compositions of the invention include one or more polymers, preferably polymers suitable for use in additive manufacturing systems and methods. The polymers include, but are not limited to, acrylonitrile butadiene styrene (ABS), polylactic acid (PLA), polyamide (PA or Nylon), polycarbonate (PC), and combinations thereof.

The compositions of the invention also incorporate one or more detector materials therein. The detector materials are preferably distributed throughout the polymer, and in some aspects of the invention, the distribution of the nanoparticles of detector material in the polymer is uniform or approximately uniform. The detector materials are preferably provided as nanoparticles of the detector materials. In the context of the invention, the nanoparticles may range in size from 1 nm to 200 nm, preferably from 2 nm to 100 nm, more preferably from 5 nm to 50 nm.

The detector materials are preferably formed of a non-polymeric material. The nanoparticles may comprise elements selected from metals, metalloids, and solid non-metals. Preferred metals include indium, gold, copper, silver, titanium, rhodium, nickel, iron, aluminum, and niobium. Nanoparticles of silicon and sulfur may also be incorporated into the compositions of the invention. In some aspects of the invention, nanoparticles of gold, copper, indium, and sulfur are preferred neutron detector materials, and are used in combination. Another preferred combination includes nanoparticles of copper, titanium, nickel, aluminum, and indium. When several types of nanoparticles are used together, they may either be combined in a single polymer, or provided separately in separate polymers, to capture the energy profile of neutrons.

The compositions of the invention may optionally encompass one or more gamma and/or X-ray detector materials into the additive manufacturing polymers. These detector materials include, but are not limited to, LiF, NaF, CaF, $CaSO_4$ (optionally doped with Tm), LiB, BeO, CaB, KBr, ZnS, Ge(Li), Si(Li), CdTe, CdZnTe, NaI(Tl), and feldspars ($KAlSi_3O_8$—$NaAlSi_3O_8$—$CaAl_2Si_2O_8$) incorporated therein. Alternatively, the compositions of the invention may optionally be used in conjunction with gamma and/or X-ray detector materials that are provided separately (such as in a personnel dosimeter).

The compositions of the invention may include combinations of one or more neutron detection materials and one or more gamma/X-ray detection materials in multiple different additive manufacturing polymers, or they may be provided together in the same additive manufacturing polymer. The detection materials may be provided in the additive manufacturing polymers in amounts ranging from about 1 wt % to about 25 wt %, preferably from about 2 wt % to about 15 wt %, more preferably from about 3 wt % to about 10 wt %. The optimal concentration of a particular detection material needed in order to carry out the activation analysis may differ for each detection material, and may be determined by forming samples of different additive manufacturing polymers containing different amounts of the detection material of interest, exposing them to a standard ionizing radiation source, and identifying which sample provides results that are closest to the actual amount of ionizing radiation exposure. The concentration of detector material preferably does not significantly change the properties of the additive manufacturing material in which it is dispersed. In one aspect of the invention, about 5 wt % gold nanoparticles are provided in PLA.

Apparatus

Radiation dosimeters of the invention include one or more compositions of the invention. The apparatus of the invention also encompass the compositions of the invention together in combination with additional components. The apparatus of the invention may include components to monitor and/or measure nuclear criticality events and determine potential personnel exposures to ionizing radiation, such as gamma rays and neutrons.

Because the compositions of the invention are formed using polymers that can be processed using additive manufacturing techniques and equipment, and incorporate radiological detection materials in a manner that does not affect the ability of the polymers to be used in existing additive manufacturing techniques, they can be provided in any shape or configuration suitable for incorporation into an apparatus for detecting ionizing radiation. This allows the compositions of the invention to be incorporated into new or existing area dosimeters and personal dosimeters, providing, for example, nuclear criticality detection capability.

In some aspects of the invention, the compositions of the invention may be incorporated into or onto existing dosimeters, such the DT-702/PD and DT-518/PD, or used to form ring-type dosimeters. The compositions may be incorporated into or onto one or more areas of a dosimeter case or housing, or provided throughout one or more areas of a dosimeter case or housing. By incorporating the compositions of the invention into existing dosimeters, the invention provides detection apparatus with enhanced detection capabilities as compared to conventional dosimeters, and/or apparatus that combine the detection capabilities of multiple apparatus into a single dosimeter. The dosimeters of the invention may also provide greater stability in the environment in which they are used, by virtue of embedding the detector material in the polymeric additive manufacturing material. This is particularly the case for detector materials that are sensitive to moisture, oxygen, or other environmental conditions.

For example, a Harshaw™ Type 8840 thermoluminescent dosimeter (TLD) strap clip and belt loops card holder (see FIGS. 1A, 1C, and 1D) used with TLD-600™ neutron detection disc cards and/or TLD-700™ gamma and beta detection disc cards (Thermo Fischer Scientific) that may include LiF:Mg, Cu, P; LiF:Mg, Ti; $CaF_2$:Mn; or $CaF_2$:Dy as detector materials (see FIG. 1B) may be augmented by including the compositions of the invention. The compositions of the invention may be 3-D printed or otherwise manufactured to have a form that is structurally compatible with the Harshaw™ Model 8840 holder (e.g., printed into a shape that can be affixed to the holder, or used to form all or a portion of the holder structure), as shown in FIGS. 2 and 3.

Figure 3:
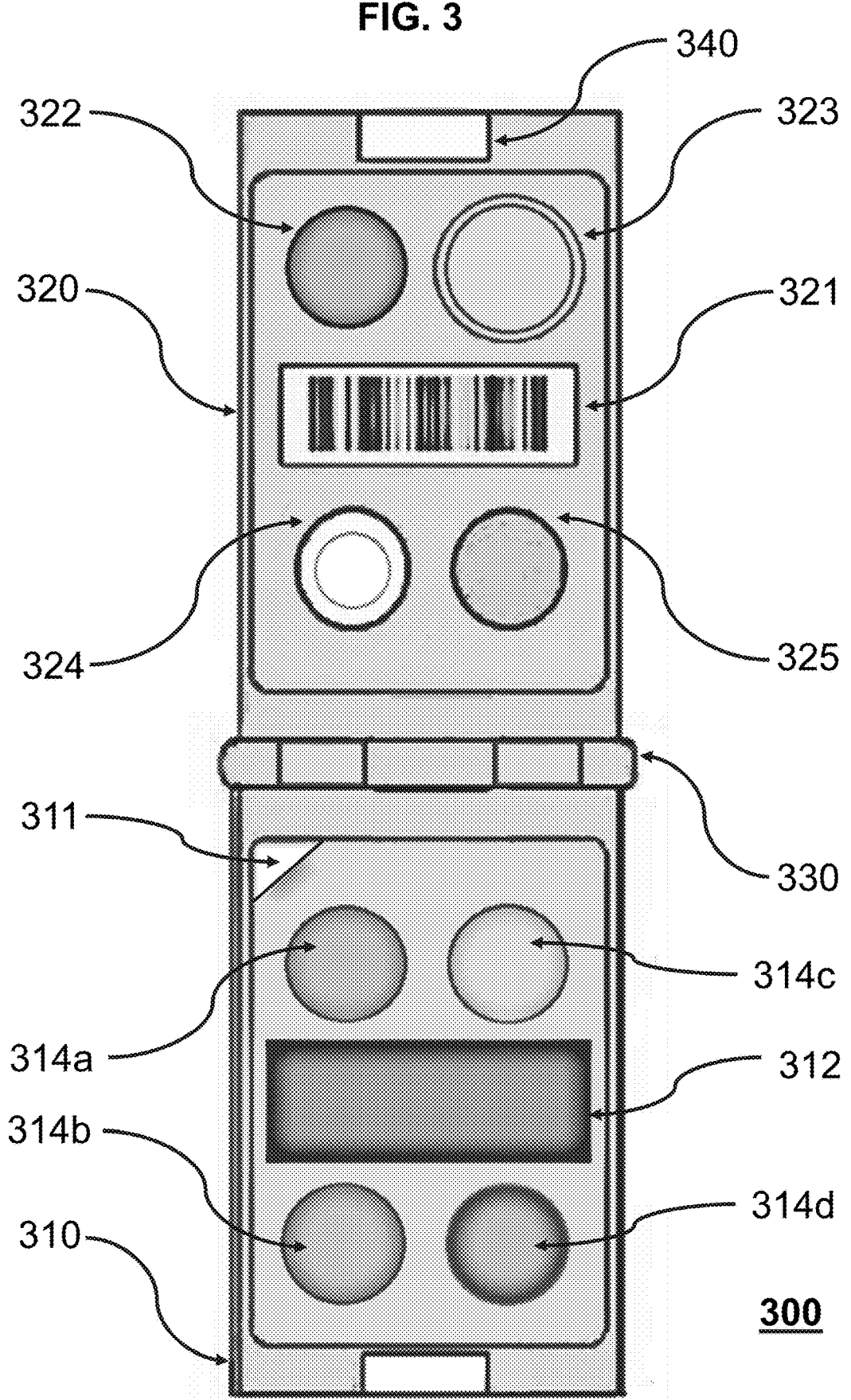
FIG. 3 is a front view of the opened Harshaw Model 8840 card holder, showing the internal components of the card holder without the Harshaw Model 8841 card therein. A second option for providing the compositions of the invention within the DT-702/PD is shown.

FIGS. 2 and 3 depict Harshaw™ Model 8840 holders 200, 300 that have been supplemented with the compositions of the invention. The card-holding portions of the holders 210, 310 incorporate windows 212, 312 for viewing an identification portion of a thermoluminescent detector (TLD) card (such as the card shown in FIG. 1B) when it is placed in the holder 200, 300. A notch 211, 311 may be provided in the card-holding portion of the holder to facilitate proper alignment of the TLD card in the holder. The filter-holding portions of the holders 220, 320 may also have an identification portion 221, 321 provided therein to facilitate assigning holders to individual personnel for long-term tracking. The filter-holding portions of the holders 220, 320 also incorporate four filters or windows (322, 323, 324, 325), one for each of the four detector materials provided on the detector cards. The card-holding and filter-holding portions are shown as being held together by a hinge 230, 330, although other mechanisms may be used to attach the card holding portion to the filter containing portion. A latch mechanism 240, 340 may also be provided to prevent unintentional opening of the holder.

FIG. 2 depicts a Harshaw™ Model 8840 holder that has been supplemented in the card-holding portion 210 with the compositions of the invention 214a, 214b, 214c, 214d, which extend across the area of window 212. The compositions may be the same or different, and encompass the range of compositions provided in accordance with the invention. In some aspects of the invention, the compositions are a polymer having sulfur nanoparticles embedded therein, a polymer having indium nanoparticles therein, a polymer having gold nanoparticles embedded therein, and a polymer having copper nanoparticles embedded therein.

FIG. 3 depicts a Harshaw™ Model 8840 holder that has been supplemented in the card-holding portion 310 with the compositions of the invention 314a, 314b, 314c, 314d, which are provided in a configuration that surrounds window 312. The compositions may be the same or different, and encompass the range of compositions provided in accordance with the invention. In some aspects of the invention, the compositions are a polymer having sulfur nanoparticles embedded therein, a polymer having indium nanoparticles therein, a polymer having gold nanoparticles embedded therein, and a polymer having copper nanoparticles embedded therein.

Figure 4:
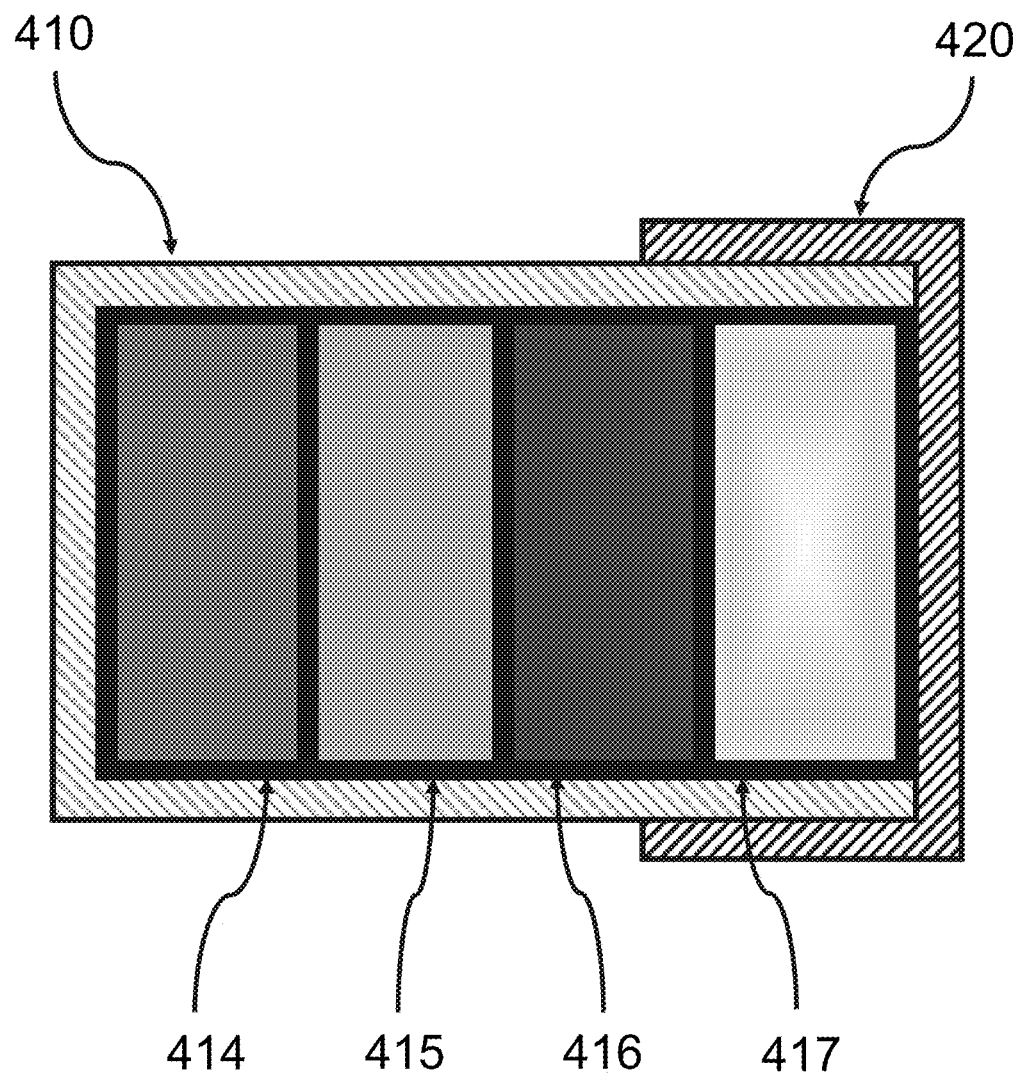
FIG. 4 is a side view of a separate container incorporating the compositions of the invention.

As shown in FIG. 4, a separate radiation dosimeter apparatus 400 is also provided that includes one or more compositions of the invention. For example, a polymer having sulfur nanoparticles embedded therein 414, a polymer having indium nanoparticles therein 415, a polymer having gold nanoparticles embedded therein 416, and a polymer having copper nanoparticles embedded therein 417 may be provided in an environmental hazard resistant container 410 formed of a material such as plastic, stainless steel, or aluminum, and used as a personal nuclear accident dosimeter (PNAD) or provided separately for area monitoring as a fixed nuclear accident dosimeter (FNAD). In the embodiment shown in FIG. 4, a cross-section of a container 410 is shown, in which the container is covered by a cap or other closure 420, which may be formed from the same material as the container 410 or a different material. The container is not limited in terms of shape, and the container may take the form of a cylinder, rectangle, or other shape. One or more desiccants and/or oxygen absorbing materials may optionally be included in the container along with the compositions of the invention (not shown). The apparatus may be used, for example, to detect exposure to ionizing radiation from neutrons, gamma rays, x-rays, and/or beta particles, depending on the selected radiation detection materials.

The compositions of the invention may be provided to form a dosimeter that includes a single detection material dispersed in a polymeric material. Two or more compositions of the invention may be combined to form a dosimeter that includes two or more detection materials, each capable of capturing different energies, particularly for neutron detection. A single composition of the invention in which a combination of detector materials are blended together and dispersed in a single polymeric material may also be provided to form a dosimeter. For example, a dosimeter may include multiple detection materials (such as gold, copper, indium, and sulfur nanoparticles), blended together within a polymeric material (which may itself be formed using a blend of polymers).

The compositions of the invention may also be used to form a dosimeter that is independent of any other dosimeter apparatus or components. These dosimeters of the invention may have any configuration, such as a panel or panels for mounting on a wall, floor, or tabletop; a three-dimensional shape (such as a wedge, rectangular prism, or cylinder) configured to be placed in a corner or between objects; or any other shape suited for the environment in which it will be used.

Figure 5:
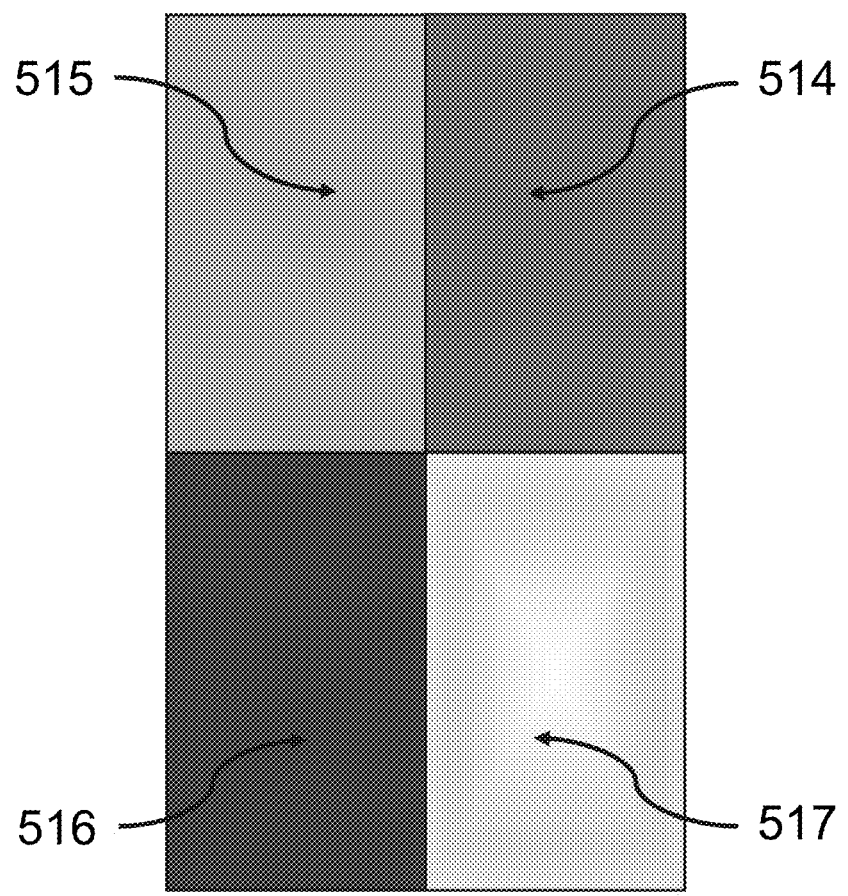
FIG. 5 depicts a four-quadrant panel formed using the compositions of the invention.

In the embodiment shown in FIG. 5, a FNAD apparatus is provided in the form of a panel 500 having four quadrants, where a first quadrant includes a polymer with sulfur nanoparticles embedded therein 514, a second quadrant includes a polymer with indium nanoparticles therein 515, a third quadrant includes a polymer with gold nanoparticles embedded therein 516, and a fourth quadrant includes a polymer with copper nanoparticles embedded therein 517. The dosimeter apparatus is not limited to four quadrants each containing a different detection material. The number of different detection materials will depend on the expected radiation exposure and desired level of discrimination. Any size may be adopted.

Regardless of configuration, the various apparatus of the invention may optionally be provided in conjunction with additional components to allow personnel to determine if the detection apparatus has potentially been exposed to radiation. These may include, but are not limited to, indicators such as a fluor or scintillator material provided in one or more of the compositions of the invention; analog or digital meters such as those provided, for example, in association with an ionization chamber radiation detector; high purity Germanium (HPGe) semiconductor detectors; Geiger-Mueller counters; or silicon diode detectors.

Methods

Metal nanoparticles may be formed using existing techniques known to those skilled in the art. Gold nanoparticles may be formed, for example, using the Turkevich method (see J. Turkevich, et al., "Nucleation and growth process in the synthesis of colloidal gold," *Discuss Faraday Soc.*, 1951, 11:55-75), the Brust-Schiffrin synthesis (BSS) method (see M. Brust, et al., "Synthesis of thiol-derivatised gold nanoparticles in a two-phase Liquid-Liquid system," *J. Chem. Soc., Chem. Commun.*, 1994, 7:801-802), and other methods discussed in literature (including R. Herizchi, et al. "Current methods for synthesis of gold nanoparticles," *Artificial Cells, Nanomedicine, and Biotechnology*, 2014, 1-7).

In accordance with one aspect of the invention, metal nanoparticles, and/or nanoparticles of any other detection materials, are dissolved or suspended in a solvent or solvent mixture that is also capable of dissolving a polymer. This beneficially provides a uniform or substantially dispersion of the metal nanoparticles. The polymers used in the compositions of the invention are preferably soluble in one or more organic solvents such as toluene, benzene, acetone, methylene chloride, DMSO, methyl ethyl ketone (MEK, 2-butanone), dichloromethane, tetrahydrofuran (THF, oxolane), dichloromethane (DCM), and 1,4-dioxane. In some aspects of the invention, the polymers are thermoplastic polymers. In further aspects of the invention, the polymers are suitable for use in additive manufacturing techniques. In one aspect of the invention, the detection material is suspended in the solvent at a concentration of from about 1 mg/cm$^3$ to about 50 mg/cm$^3$, preferably from about 5 mg/cm$^3$ to about 25 mg/cm$^3$. When gold nanoparticles are provided in toluene, they are preferably present at a concentration of about 10 mg/cm$^3$.

Once the solution or suspension of nanoparticles, and the solution of the polymer(s) have been formed, they are mixed together until the metal nanoparticles and/or detection materials are dissolved or suspended in the solution of the polymer. The solvent or solvents are then evaporated, preferably with stirring, agitation, or shaking, until most solvent has evaporated and the polymer containing the nanoparticles has solidified. Preferably, at least 90% of the solvent is removed from the material, more preferably at least 95%, and most preferably at least 99% of the solvent is removed from the polymer.

In accordance with another aspect of the invention, metal nanoparticles and/or detection materials can be incorporated into a fine powder of the polymer(s) and then extruded. The nanoparticles are blended into the powdered polymer(s) until they are substantially uniformly dispersed throughout.

The polymer having metal nanoparticles and/or detection materials dispersed throughout may be used in additive manufacturing techniques, which may be carried out using additive manufacturing apparatus. The composition can be 3D printed into any desired form or shape, including shapes tailored to allow the composition to be inserted into or attached onto existing dosimeters (for example, the DT-702/PD). The compositions of the invention may be used to replace one or more components of existing dosimeters, to augment existing dosimeters, or to form entirely new dosimeter structures. Alternatively, the compositions of the invention may be processed using other plastic processing techniques, such as molding or extruding melted compositions, or cutting or milling solidified compositions.

The compositions and apparatus of the invention may be used to provide methods for immediate, direct measurement of radiation exposure. The level of radiation to which the compositions of the invention have been exposed can be determined using various techniques and apparatus. For example, HPGe detectors and Geiger-Mueller-type detectors can be used to provide measurements of radiation for the compositions that incorporate gold, copper, or indium. An alpha/beta counter or an open-window Geiger-Mueller-type detector can be used to provide measurements of radiation for the compositions that incorporate sulfur. Radiation detection readings using the compositions of the invention may be obtained after calibrating the detector using the composition or compositions of the invention prior to being exposed to radiation, or material taken from a batch of material used to prepare the compositions of the invention. Calibration is preferably carried out in accordance with an accepted calibration standard, such as American National Standards Institute (ANSI) 13.3-2015.

Based on radiation measurements obtained using the compositions of the invention (for example, type(s) of radiation, energy level(s), and radiation dosage(s)), medical interventions for exposed personnel and/or remediation actions for the radiation-contaminated area may be utilized.

These techniques and apparatus may be used regardless of whether the compositions are incorporated into a dosimeter apparatus or provided separately. If a separate dosimeter apparatus is used in conjunction with the compositions of the invention, the radiation levels that detected using the compositions and apparatus of the invention may be used to verify doses measured using the separate dosimeter apparatus.

An unexpected advantage of the methods of the invention is that the form and function of the polymeric material can be altered to provide additional characteristics that are functional in nature (e.g., the ability to be used to detect radiation doses), without significantly affecting the ability of the material to be used in additive manufacturing. This enables a criticality dosimeter component in the form of nanoparticles to be incorporated into the architecture of existing dosimeters lacking this capability. For example, compositions that incorporate one or more of a sulfur component, a copper component, an indium component, and a gold component can be provided in a lithium-based card and holder type dosimeter. In the event of a criticality, the lithium dosimeter card holder can be analyzed immediately using readily-available radiation detection instruments (i.e., an ionization chamber radiation detector; high purity Germanium (HPGe) semiconductor detector; Geiger-Mueller counter; or silicon diode detector), while the dosimeter card is sent for further evaluation.

By adding this radiation (and particularly neutron) detection capability to polymers, criticality dosimeters are provided that are less susceptible to the degradation that can occur in dosimeters (such as the DT-518/PD) because it is soluble in plastic versus being enclosed in a single encapsulation.

EXAMPLES

The invention will now be particularly described by way of example. However, it will be apparent to one skilled in the art that the specific details are not required in order to practice the invention. The following descriptions of specific embodiments of the present invention are presented for purposes of illustration and description. They are not intended to be exhaustive of or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

Example 1

Au nanoparticles (AuNP) were synthesized in the presence of n-alkanethiols using two-phase (water-toluene) reduction of $HAuCl_4$. Specifically, 0.1 g of a $HAuCl_4.3H_2O$ solution (1% (w/w), Aldrich) was dissolved in 10 ml distilled water and added to 10 ml of toluene containing 2% tetraoctylammonium bromide. The solution was mixed vigorously by stirring, and the gold was transferred to the organic phase, as confirmed by a color change of the two phases, from yellow in water to red in toluene. A mixture of 7 mg 11-MUA (11-mercaptoundecanoic acid) and 15 mg 1-OT (1-octanethiol) dissolved in 3 ml toluene (11-MUA:1-OT=1:3 reaction ratio) was added to the separated toluene layer containing the transferred gold, and stirred again. For the reduction and formation of gold colloids, 10 ml of distilled water containing 0.09 g NaBH4 was added slowly, and stirred for 4 hr. The toluene layer containing n-alkanethiol-stabilized AuNPs (n-alkanethiol-AuNPs) was saved and stored at 4° C. The resulting precipitate of AuNPs was separated and resuspended in toluene. The AU NP-toluene solution was concentrated to a level of 10 mg/cm$^3$.

PolyLactic Acid (PLA) (2 g) was dissolved in toluene and then added to the AuNP-toluene solution. The mixture was placed in a rotary evaporator to remove the solvent and produce a slug of AuNP-loaded PLA.

Example 2

Figure 6:
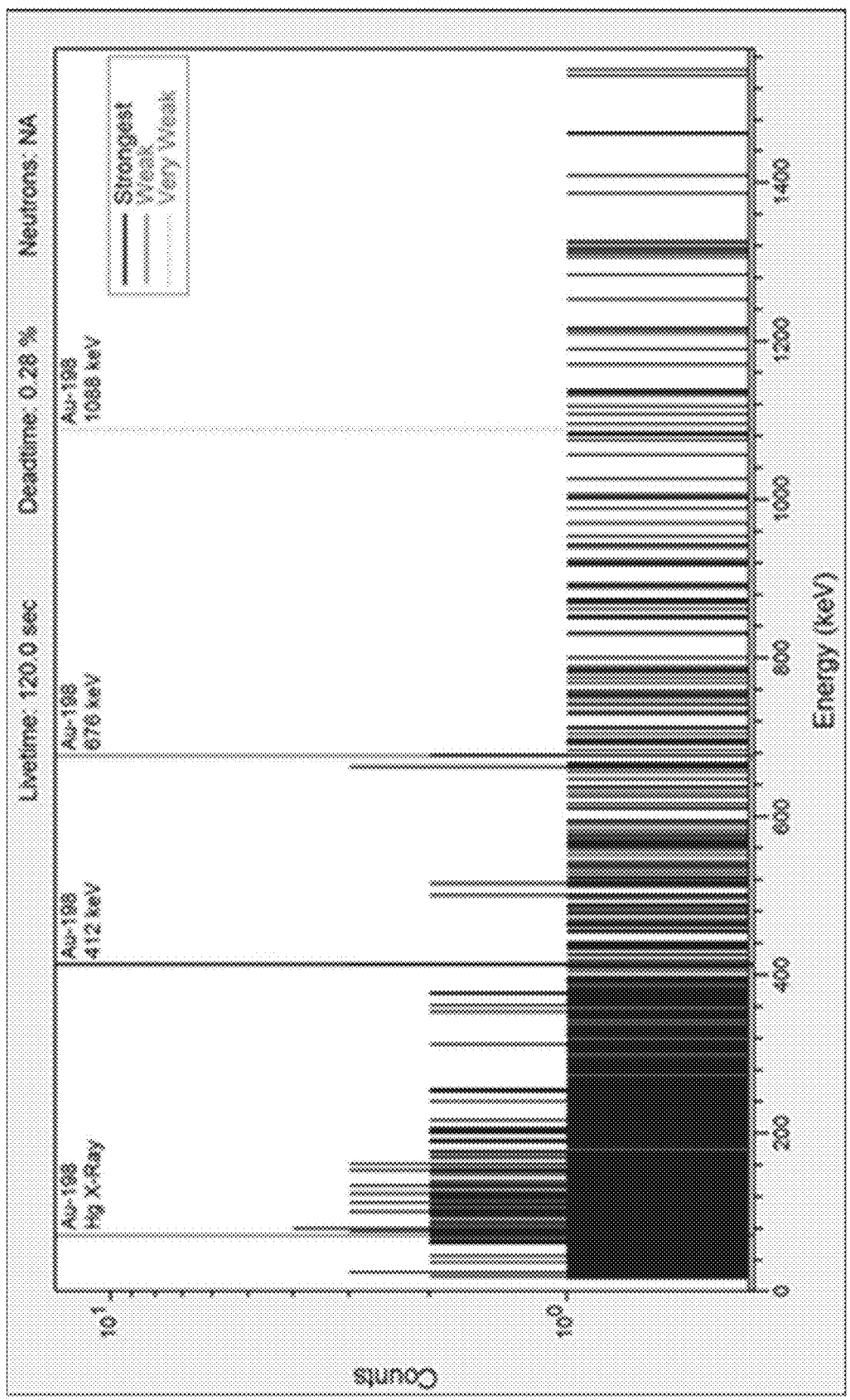
FIG. 6 is a gamma spectroscopy assessment of an activated AuNP-loaded PLA sample.

After 5 wt % Au NP with 95 wt % PLA was prepared, a neutron activation of the material was conducted to validate that the concentration was sufficient to be evaluated using gamma spectroscopy. A sample of the Au-loaded PLA was exposed to three PuBe neutron-moderated spectra for a period of a week. Subsequent to the activation period, the sample was evaluated in a gamma spectrometer, looking for the neutron-activated element of natural gold (i.e., the isotope $^{198}$Au). FIG. 6 shows the resulting spectrometry data.

Example 3

Figure 7:
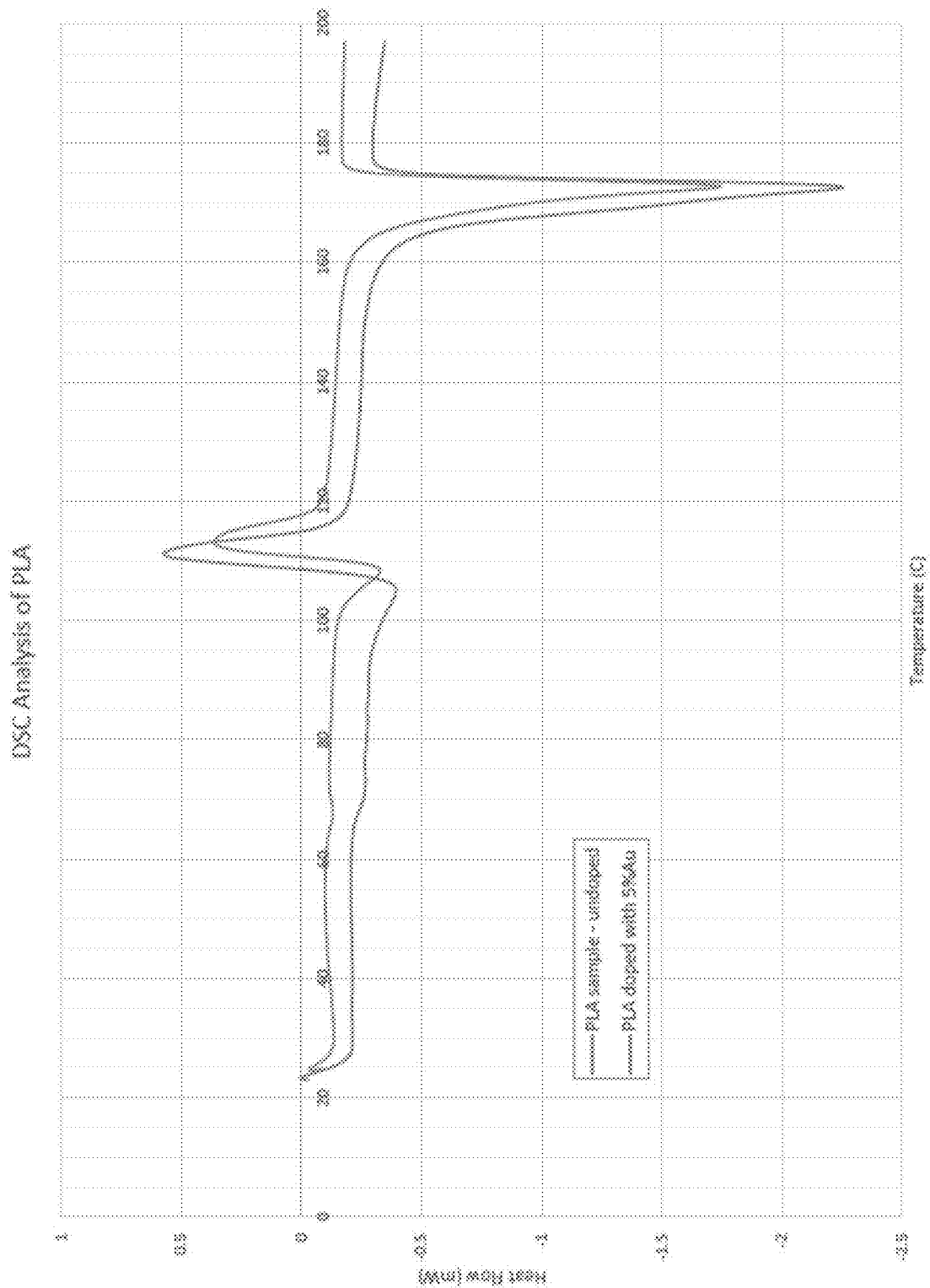
FIG. 7 is a differential scanning calorimetry (DSC) analysis of the activated AuNP-loaded PLA sample.

Thermal properties of the AuNP-loaded PLA were evaluated to ensure that the additive manufacturing characteristics of the material had not changed dramatically. FIG. 7 shows a differential scanning calorimetry (DSC) analysis of the Au—NP loaded PLA. The analysis verifies that the thermal properties remained relatively equivalent to native untreated PLA sample.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A nuclear criticality dosimeter, comprising:
    a first neutron detection composition comprising gold nanoparticles dispersed through a polymer selected from the group consisting of acrylonitrile butadiene styrene (ABS), polylactic acid (PLA), polyamide (PA), polycarbonate (PC), and combinations thereof, and
    a second neutron detection composition comprising sulfur nanoparticles dispersed through a polymer selected from the group consisting of ABS, PLA, PA, PC, and combinations thereof,
    where the nanoparticles in the first and second neutron detection compositions are activated by neutron radiation exposure during a nuclear criticality, and emit radiation corresponding to the neutron radiation exposure.

2. The nuclear criticality dosimeter of claim 1, where the nanoparticles range in size from 1 nm to 200 nm.

3. The nuclear criticality dosimeter of claim 1, where the nanoparticles are provided in the polymer in an amount ranging from about 1 wt % to about 25 wt %.

4. The nuclear criticality dosimeter of claim 1, where each of the first and second neutron detection compositions detects a different energy level of neutron radiation exposure.

5. The nuclear criticality dosimeter of claim 1, where the nuclear criticality dosimeter comprises a further neutron detection composition comprising nanoparticles of copper dispersed through a polymer selected from the group consisting of ABS, PLA, PA, PC, and combinations thereof.

6. The nuclear criticality dosimeter of claim 1, where the nuclear criticality dosimeter comprises a further neutron detection composition comprising nanoparticles of indium dispersed through a polymer selected from the group consisting of ABS, PLA, PA, PC, and combinations thereof.

7. A nuclear accident detection apparatus, comprising:
    a radiation dosimeter comprising a container and one or more radiation detection materials therein;
    a polymeric neutron detection composition provided as at least a portion of the container, the polymeric neutron detection composition comprising nanoparticles of gold, and sulfur dispersed through a polymer selected from the group consisting of acrylonitrile butadiene styrene (ABS), polylactic acid (PLA), polyamide (PA), polycarbonate (PC), polyvinyl alcohol (PVA), and combinations thereof,
    where the nanoparticles in the neutron detection composition are activated by neutron radiation exposure during a nuclear criticality, and emit radiation corresponding to the neutron radiation exposure.

8. The nuclear accident detection apparatus of claim 7, where the nanoparticles range in size from 1 nm to 200 nm.

9. The nuclear accident detection apparatus of claim 7, where the nanoparticles are provided in the polymer in an amount ranging from about 1 wt % to about 25 wt %.

10. The nuclear accident detection apparatus of claim 7, where the polymeric neutron detection composition is provided on an inner surface of the container.

11. The nuclear accident detection apparatus of claim 7, where the polymeric neutron detection composition is provided on an outer surface of the container.

12. The nuclear accident detection apparatus of claim 7, where some or all of the container comprises the polymeric neutron detection composition.

13. The nuclear accident detection apparatus of claim 7, where the gold and sulfur nanoparticles each detect a different energy level of received neutron radiation.

14. The nuclear accident detection apparatus of claim 7, where polymeric neutron detection composition further comprises nanoparticles of copper.

15. The nuclear accident detection apparatus of claim 7, where the polymeric neutron detection composition further comprises nanoparticles of indium.

16. A method for assessing exposure to neutron radiation during a criticality event, comprising:
    providing a first polymeric neutron detection composition comprising nanoparticles of gold dispersed through a polymer selected from the group consisting of acrylonitrile butadiene styrene (ABS), polylactic acid (PLA), polyamide (PA), polycarbonate (PC), polyvinyl alcohol (PVA), and combinations thereof;
    providing a second polymeric neutron detection composition comprising nanoparticles of sulfur dispersed through a polymer selected from the group consisting of ABS, PLA, PA, PC, PVA, and combinations thereof,
    measuring activation radiation emitted by the first and second polymeric neutron detection compositions,
    and determining neutron radiation exposure based on the measured activation radiation.

17. The method of claim 16, further comprising comparing measured activation radiation of the first neutron detection composition with measured activation radiation of the second neutron detection composition.

18. The method of claim 16, further comprising using the determined neutron radiation exposure to select remediation actions for the radiation-contaminated area.

19. The method of claim 16, comprising providing a further polymeric neutron detection composition comprising nanoparticles of copper dispersed through a polymer selected from the group consisting of ABS, PLA, PA, PC, and combinations thereof.

20. The method of claim 16, comprising providing a further polymeric neutron detection composition comprising nanoparticles of indium dispersed through a polymer selected from the group consisting of ABS, PLA, PA, PC, and combinations thereof.

* * * * *